United States Patent
Mesard et al.

(10) Patent No.: US 11,431,720 B1
(45) Date of Patent: *Aug. 30, 2022

(54) AUTHENTICATION AND AUTHORIZATION WITH REMOTELY MANAGED USER DIRECTORIES

(71) Applicant: Amazon Technologies, Inc., Seattle, WA (US)

(72) Inventors: Wayne Mesard, Hingham, MA (US); Kevin Sellers, Hopkinton, MA (US); Justin Schoeff, Somerville, MA (US); John M. Jamail, Sudbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,740

(22) Filed: Dec. 28, 2020

Related U.S. Application Data

(63) Continuation of application No. 16/198,475, filed on Nov. 21, 2018, now Pat. No. 10,880,312.

(51) Int. Cl.
*H04L 29/06* (2006.01)
*H04L 9/40* (2022.01)
*H04L 9/30* (2006.01)

(52) U.S. Cl.
CPC ............ *H04L 63/102* (2013.01); *H04L 9/30* (2013.01); *H04L 63/083* (2013.01); *H04L 63/166* (2013.01)

(58) Field of Classification Search
CPC ... H04L 63/102; H04L 63/104; H04L 63/083; H04L 63/20; H04L 63/08; H04L 9/30; H04L 63/166; G06F 21/31
See application file for complete search history.

(56) References Cited

U.S. PATENT DOCUMENTS 9,172,680 B2 * 10/2015 Marlow .............. H04W 12/088
9,210,178 B1 * 12/2015 Roth ..................... H04L 63/105
(Continued)

OTHER PUBLICATIONS

Office Action for U.S. Appl. No. 16/198,475, dated May 11, 2020, Mesard, "Authentication and Authorization with Remotely Managed User Directories", 4 Pages.

*Primary Examiner* — Hosuk Song
(74) *Attorney, Agent, or Firm* — Lee & Hayes, P.C.

(57) ABSTRACT

Techniques for a service provider network to authenticate client devices and determine authorizations for users by sending requests for information in remotely managed user directories. The service provider network may provide computing infrastructure to service requests from users who have accounts with a subscriber of the service provider network. The subscriber may maintain user information for the various user accounts usable to authenticate client devices and/or determine authorizations of users. The service provider network may receive a request from a client device to execute a workflow for a service of the subscriber that is supported by resources of the service provider network. The service provider network may send a request to a subscriber device for user account information for authentication and determining authorization. For instance, the service provider network may request a public key to authenticate the client device, and/or authorization information indicating permissions granted for a user account.

20 Claims, 10 Drawing Sheets

(56) References Cited

U.S. PATENT DOCUMENTS

| | | | | |
|---|---|---|---|---|
| 9,270,703 | B1 * | 2/2016 | Clough | H04L 63/20 |
| 9,306,935 | B2 * | 4/2016 | Bowen | H04L 9/14 |
| 9,319,392 | B1 * | 4/2016 | Irving, Jr. | H04L 63/102 |
| 9,390,247 | B2 * | 7/2016 | Watanabe | H04L 63/18 |
| 9,483,627 | B1 * | 11/2016 | Ferg | H04W 12/069 |
| 9,591,000 | B2 | 3/2017 | Shokhrin et al. | |
| 9,602,482 | B1 | 3/2017 | Roth et al. | |
| 9,648,040 | B1 | 5/2017 | Morkel et al. | |
| 9,811,365 | B2 | 11/2017 | Borthakur | |
| 9,882,957 | B1 | 1/2018 | Mostert | |
| 10,129,078 | B2 | 11/2018 | Kumar et al. | |
| 10,880,312 | B1 * | 12/2020 | Mesard | H04L 63/083 |
| 11,050,722 | B2 * | 6/2021 | Noda | H04L 63/0435 |

\* cited by examiner

US 11,431,720 B1

AUTHENTICATION AND AUTHORIZATION WITH REMOTELY MANAGED USER DIRECTORIES

RELATED APPLICATIONS

This application claims priority to and is a continuation of U.S. patent application Ser. No. 16/198,475, filed on Nov. 21, 2018, the entire contents of which are incorporated herein by reference.

BACKGROUND

Service provider networks offer cloud-based services to fulfill subscribers' computing-service needs without the subscribers having to invest in and maintain computing infrastructure required to implement the services. These service provider networks may provide many different types of services to subscribers, such as on-demand computing services, managed-database services, software-execution services, and message queuing services. Due to the ease of having service provider networks provide and manage the computing infrastructure on behalf of subscribers, non-subscribing users may desire to migrate the management and provisioning of their computing service needs to service provider networks.

However, it can be difficult to seamlessly migrate the management of data, workflows, and/or other computing processes that are currently performed using on-premise computing devices of the non-subscribing users to be performed by service provider networks. Additionally, non-subscribing users may wish to only migrate portions of the different computing service needs to be managed by a service provider network, and maintain control of other portions of their computing service needs and infrastructure. Accordingly, non-subscribing users may desire flexibility with respect to what portions of their computing needs are managed by service provider networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

In FIG. 5, the set of permissions are indicated by the remote subscriber device in response to sending a single authentication and authorization request to a network endpoint.

In FIG. 6, the set of permissions are indicated by the remote subscriber device in response to sending an additional authorization request to a network endpoint after an initial authentication request.

DETAILED DESCRIPTION

Figure 1:
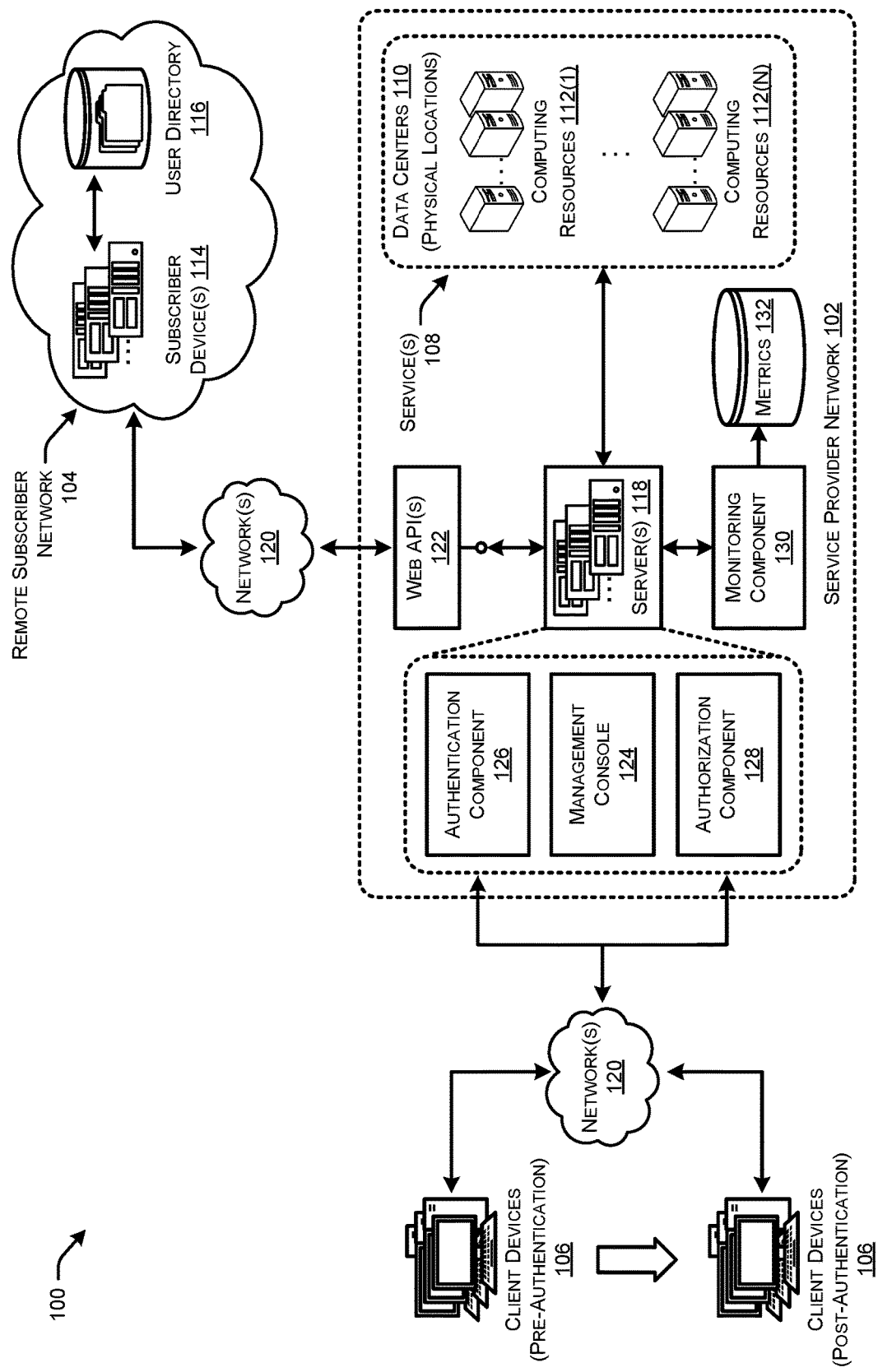
FIG. 1 illustrates a system-architecture diagram of an example environment in which a service provider network communicates with a remote subscriber network to receive user information for authenticating client devices, and determining authorizations for users of the client devices.

This disclosure describes, at least in part, techniques for a service provider network to perform authentication and authorization techniques for users of client devices by receiving user account information from remotely managed user directories. The service provider network may provide computing infrastructure to service requests from users who have accounts with a subscriber of the service provider network. However, the subscriber may store and manage user information for the various user accounts that is used to authenticate and/or authorize the users of the client devices. In some examples, the service provider network may receive a request from a client device to log into their user account with the subscriber to interact with a service of the subscriber that is supported by the computing resources in the service provider network. The service provider network may send a request (or call), such as by using a web-based Application Programming Interface (API), to a subscriber device (or "on-premise" device) that is managed by the subscriber to provide user information for authenticating the user of the client device. For instance, the service provider network may send a request, that includes the username and/or password, through the web API to a network endpoint associated with the subscriber device for user information that is stored in a user directory managed on-premise by the subscriber. The user information may include a public key useable to authenticate the client device, an indication of whether the username and password are valid, and/or other information usable to authenticate the user of the client device.

Additionally, the service provider network may request, as part of the initial request or through another web API call, that the subscriber provide an indication of access permissions for a role of the user account that defines what types of operations, workflows, actions, etc., the particular user account is authorized to perform. Once the client device of the user has been authenticated, the service provider network may assume the role of the user account that is granted the access permissions, and perform requested operations from the client device if permitted by the role of the user account. In this way, subscribers may migrate the management, updating, and/or provisioning of computing resources that support the services provided to their users to be performed by the service provider network, while still being able to manage the user account information stored in the user directory used for authentication and/or authorization.

Traditionally, subscribers of the computing resources and/or services provided by service provider networks maintain and manage on-premise computing infrastructure (e.g., servers, networking devices, etc.) to support various subscriber services provided to users of the subscriber. For instance, a provider of a video streaming service may provide on-demand streaming of video content to users who have registered for accounts with the provider. According to the techniques described herein, the provider may subscribe for an account with the service provider network to have the computing infrastructure supporting the video streaming service (e.g., memory, processing power, auto-scaling, networking and content delivery, etc.) provided for and managed by the service provider network. However, the provider may desire to manage the user account information that is used for, among other purposes, authentication and authorization.

After a subscriber of the service provider network subscribes or register for an account with the service provider network, the subscriber may migrate existing data, workflows, applications, etc., for their users from their on-premise devices located in a network managed, owned, and/or operated by the subscriber (or "subscriber network") to computing resources of the service provider network. However, the subscriber may refrain from migrating the user account information stored in one or more user directories or databases for users of their services.

To service requests received from users of the subscriber, the service provider network may provide a virtual server for the subscriber account that is supported or backed by a fleet of computing instances, such as physical servers, that scale based on changes in traffic from user requests. The subscriber may map their existing hostname(s) to the virtual server to enable the client device traffic from their users to automatically route to the virtual server. The virtual server may be configured to service requests that are received from client devices of users as the virtual server may be backed by an auto-scaling group of computing instances is are governed by one or more network load balancers (NLB).

Upon receiving a request from a user of a client device, the virtual server may be configured to perform various authentication techniques before servicing requests for the client device. For instance, the virtual server may be configured to perform authentication using Digital Certificates, username/password combinations, Public Key Authentication, and/or other authentication techniques to authenticate the client device. In the request to access data and/or services associated with the subscriber, the client device may include a username (or other identifier) and/or password to indicate the user account that is registered with the subscriber. In this way, the virtual server may have an indication of the user account for the client device that is sending a request, but the virtual server may not have user account information to authenticate the client device.

The virtual server of the service provider network may be configured to perform various authentication techniques. As an example, the subscriber may authenticate client devices of users via a public key authentication method or protocol that is used by the client devices to communicate with the virtual server. In a specific example, the client devices may be configured to authenticate themselves to servers using a protocol such as Secure File Transfer Protocol (SFTP) to read and/or write data to memory or storage managed by the service provider network on behalf of the subscriber account. In such examples, the virtual server may request that the subscriber provide one or more public keys for use in authenticating the client device that is sending a request to read and/or write data. To respond to the requests from the virtual server, the subscriber may supply web-accessible functions or processes that retrieve the public key(s) when called using an API. In some instances, the API may be a web API that is provided as a service by the service provider network. The virtual service may call the web API to cause the subscriber-supplied function to retrieve the public key(s), and include the username and/or password as input parameters for the API call. The subscriber-supplied functions, which may execute on a subscriber device in the subscriber network, may look-up the public key(s) that are mapped to, or otherwise associated with, the user account associated with the username. The subscriber function can then respond to the web API with a response that includes the public key(s) for the user account. In some examples, the response may be in a format that is readable by the virtual server. Upon receiving the public key(s), the virtual server may be configured to authenticate the client device using the public key authentication method of SFTP.

As noted above, however, the virtual server may be configured to authenticate the client device using other authentication methods. For instance, the virtual server may request that the subscriber verify the username and password for a user account by calling the web API and including the username and password provided by the client device. The subscriber device may perform a look-up in the user directory to determine whether the username and password are correct for the user account. The subscriber device may then respond to the web API request with an indication of whether or not the username and password are correct for the user account (e.g., true or false), and the virtual server may authenticate the client device of the user based on whether the subscriber verified the username and password for the user account.

In this way, and/or by using other authentication methods or protocols, the virtual server may utilize one or more web APIs (or other web-based communicating means) to authenticate a client device or a user by requesting and receiving user information from a subscriber that manages a user directory. Thus, the virtual server may able to perform authentication techniques and methods for client devices, but subscribers of service provider networks are still able to manage and maintain user directories that store user information for user accounts. The techniques described herein may allow for subscribers to maintain and/or manage private and sensitive user information for user accounts, while still enabling a service provider network to perform authentication methods for client devices that are attempting to interact with data and/or services that are provided by the subscriber, but supported by computing resources of a service provider network.

In some examples, the virtual server may further determine authorizations of users of client devices that specify access permissions for different user accounts. In some examples, the subscriber may grant different sets of permissions or access rights for various user accounts. For instance, a normal user account may be assigned with lower-access rights, or a lower-access "role," that has more restrictions in place regarding the operations taken by the user account compared to a higher-access role given to an admin account. As a specific example, an admin role may include access rights that allow admin accounts to read more sensitive data from memory or storage managed by the service provider network, whereas a user role may include access rights that restrict user accounts from reading the more sensitive data. The virtual server may further perform techniques for communicating with the subscriber device to determine different authorizations for user accounts.

To determine authorizations for a user account, the web API used to request the user information for authenticating the client device and/or the user may further be used to request and receive the authorization information. For example, when the virtual server calls the web API to request user information from the subscriber device for authentication, the web API may also be configured to receive authorization information from the subscriber device. However, in other examples, a separate web API may be configured to be called by the virtual server to request the authorization information from the subscriber device.

The subscriber device may map, maintain, or otherwise associate authorization information for the user accounts in the user directory. Authorization information may comprise and data that indicates sets of permissions for service requests. Depending on the service provider network, subscriber account, service, etc., the authorization information may be defined using different mechanisms. For example, the authorization information may indicate a role of the user account, where the role is defined by the service provider network as being associated with a set of permissions. Accordingly, the subscriber device may respond to the web API call with an indication of the role of the user account, and the virtual server may determine that set of permissions that are defined by the service provider network for the role. Additionally, or alternatively, the subscriber device may respond with one or more variables that may be utilized to populate a policy document of the service provider network that defines the sets of permissions for a role with additional granularity. The policy documents may define a set of scope-down permissions for the role that provide additional permissions, or restrictions, for a user account. Thus, the subscriber device may respond to one or more web API calls with various authorization information that indicates a set of permissions for the user account.

Upon authenticating the client device, and upon obtaining the authorization information for the user account, the virtual server may establish a session for the client device to interact with the service and/or data associated with the subscriber. For instance, the client device may begin reading and/or writing files of data to storage or memory that is managed by the service provider network. In some examples, the virtual server may perform the operations, such as reading and/or writing data, on behalf of the client device according to the role, or set of permissions, for the user account of the user of the client device. In this way, the virtual server may only perform operations during the session that the set of permissions grant the user account of the user of the client device. In some examples, the authorization information may comprise session credentials that authenticate a communication session, and may define a period of time after which the credentials expire. In this way, the subscriber may control durations of time that different user accounts are allowed or granted permission to interact with data and/or services of the subscriber by setting expiration times for session credentials.

The techniques described herein are generally applicable to different technological environments and methods. For instance, while some of the authentication techniques performed herein are described with reference to username and password authentication, and public key authentication, any type of authentication techniques may be performed using the techniques described herein. Further, while SFTP is described as being utilized to authenticate a client device and/or communicate with the client device, any type of cryptographic communication protocol, or other network protocol may be utilized, such as FTPS protocol STP protocol, Web Authentication (WebAuthn) protocol, Universal $2^{nd}$ Factor (U2F) protocol, Universal Authentication Framework (UAF) protocol, and/or any other protocol.

The techniques described herein improve the functioning of computing devices in various ways. For instance, subscribers to service provider networks may migrate the management and provisioning of their computing resource needs to service provider networks without having to maintain two parallel databases for user directories. For instance, a subscriber may create user accounts for employees of their company, and rather than having to update two parallel databases anytime an employee leaves the company or is hired, anytime a password changes, etc., the techniques described herein allow the subscriber to maintain a single user directory that is accessible to the service provider network for authenticating and/or authorizing users of client devices. Further, the techniques described herein may increase the security of using service provider networks by not sending user account information over networks to the service provider network each time a change is made to a user directory. Even further, computing resources are conserved according to the techniques described herein. The amount of data communicated between a subscriber network and a service provider network is less as changes to the user repository need not be communicated each time a modification is made, and less memory is used because two parallel user directories need not be stored in the service provider network in addition to the subscriber network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 communicates with a remote subscriber network 104 to receive user information for authenticating client devices 106, and determining authorizations for users of the client devices 106.

In some examples, the service provider network 102 may comprise clusters of managed servers stored in data centers located across geographic areas. The service provider network 102 may be a distributed network through which users (often customers) may interact via client devices 106 to manage or otherwise interact with services 108 provided by the service provider network 102. The service provider network 102 may be managed by a service provider, and may provide various types of services 108, such as an on-demand computing service, a message-queuing service, a managed-database service, a software-execution service, and/or other services. The on-demand computing service 108 may be a collection of computing resources configured to instantiate VM instances and to provide other types of computing resources on demand. For example, a customer or other user of the service provider network 102 may interact with the on-demand computing service (via appropriately configured and authenticated API calls) to provision and operate VM instances that are instantiated on physical computing devices hosted and operated by the service provider network 102. The VM instances may be used for various purposes, such as to operate as servers supporting a web site, to operate business applications or, generally, to serve as computing resources for the customer. Other applications for the VM instances may be to support database applications, electronic commerce applications, business applications and/or other applications. The message-queuing service 108 maybe a managed message queuing service that enables users to send, store, and receive messages between software components at any volume without losing messages or requiring that other services 108 be available.

A message-queuing service 108 may include different types of message queues to users. The managed-database service 108 may comprise a nonrelational database that delivers reliable performance at any scale and is fully managed, multi-region, multi-master database that provides consistent low latency, and offers built-in security, backup and restore, and in-memory caching. The managed-database service 108 may be a collection of computing resources that collectively operate to create, maintain, and allow queries to be performed on databases stored within the service provider network 102. For example, a customer or other user of the service provider network 102 may operate and manage a database from the database service by utilizing appropriately configured network API calls. This, in turn, may allow the customer to maintain and potentially scale the operations in the database. The software-execution service 108 may provide users with a serverless compute service that runs code in response to triggers and manages the underlying compute resources for users. Users can utilize the software-execution service 108 to extend other services 108 with custom logic, or back-end services that operate at service provider network 102 scale, performance, and security.

The services 108 described above, and any other services, may be provided in one particular implementation by one or more data centers 110 operated by the service provider. As known to those skilled in the art, data centers 110 are facilities utilized to house and operate computing resources 112, such as computer systems and associated components. Data centers 110 also typically include redundant and backup power, communications, cooling, and security systems. The data centers 110 might be located in geographically disparate regions, and might also be connected to various other facilities, such as co-location facilities, and various wide area networks ("WANs"), such as the Internet.

The resources 112 described briefly above might also be provisioned and de-provisioned as needed in an automated fashion. For example, the service provider network 102 might be configured to instantiate a new instance of a computing resource 110, such as a VM instance, in response to an increase in demand for a network service or other condition. Other types of computing resources 110 might also be provisioned and de-provisioned in a similar manner. Services 108 in the service provider network 102 might also provide functionality for automatically scaling and/or de-scaling resources 112 based upon demand for the resources 112 and/or other factors.

In some examples, users may interact with services 108 using client device 106. Generally, the client devices 106 may be any type of computing device capable of connecting to the service provider network 102 via a suitable data communications network 120 such as, but not limited to, a laptop or desktop computer, a tablet computing device, a server computer, or a mobile telephone. Administrative users employed by the operator of the service provider network 102, such as administrators managing the operation of the service provider network 102, might also connect with, manage, and utilize resources provided by the service provider network 102 in a similar fashion.

Traditionally, providers of services for users of client devices 106 would have to maintain and manage remote subscriber networks 104 of subscriber devices 114, such as on-premise computing infrastructure (e.g., servers, networking devices, etc.) to support various subscriber services provided to users of the subscriber. For instance, a provider of a video streaming service may provide on-demand streaming of video content to client devices 106 of users who have registered for accounts with the provider. The provider would traditionally keep track of user account information in or more user directories 116 and/or databases, such as information for authenticating client devices 106 and/or authorizing the user of the client device 106. However, in some examples the user directory 116 may be managed by another entity or device that is not included in the remote subscriber network 104 or managed by the subscriber. For example, the subscriber may enroll for use of a service that manages user account and/or user credentials. Thus, the user directory 116 may be managed or maintained on behalf of the subscriber by another service provider other than that which manages the service provider network 102. Nonetheless, the user directory 116 may be accessible by the subscriber device 114.

According to the techniques described herein, the provider may subscribe for an account with the service provider network to have the computing infrastructure (e.g., computing resources 112 in data centers 110) supporting the video streaming service (e.g., memory, processing power, auto-scaling, networking and content delivery, etc.) provided for and managed by the service provider network 102. The service provider operating the service provider network 102 may charge a fee for utilization of the resources 112 to a subscriber that have computing resources 112 provisioned to support and use services 108. The fee charged for a particular computing service 108 might be based upon the type and/or configuration of the underlying computing resources 112. For example, in the case of a data processing computing resource 112, like a VM instance, the fee for use of the service 108 might be charged based upon the amount of time the underlying computing resource 112 is utilized. In the case of a data storage computing resource 112, the fee might be computed based upon the amount of data stored and/or the amount of data transferred into or out of the computing resource. The fees for other types of resources might also be based upon other considerations. A service provider might also utilize various purchasing models to determine the amount to charge a user for use of resources provided by the service provider network 102.

After a subscriber of the service provider network 102 subscribes or register for an account with the service provider network 102, the subscriber may migrate existing data, workflows, applications, etc., for their users from their on-premise devices 114 located in a remote subscriber network 104 that is managed, owned, and/or operated by the subscriber to the computing resources 112 of the service provider network 102. However, the subscriber may refrain from migrating the user account information stored in the user directory 116 or databases for users of their services. For instance, the subscriber/provider may desire to manage the user account information that is used for, among other purposes, authentication and authorization of client devices 106 and/or users.

To receive and service varying amounts of requests received from client devices 106 that would like to access to the services 108 (e.g., request to stream video data from a video streaming service, request to access a bank account for a banking institution, etc.), the service provider network 102 may provide one or more servers 118, such as one or more physical servers, and/or one or more virtual server 118 that are supported or backed by a fleet of physical computing resources 112 or instances, that scale based on changes in traffic from user requests. The subscriber may map their existing hostname(s) to the virtual server 118 to enable traffic from the client devices 106 to automatically route to the virtual server 118. The virtual server 118 may be configured to service request that are received from client devices 106 of users as the virtual server 118 may be backed by an auto-scaling group of computing resources 112 that may be governed by one or more network load balancers (NLB).

Generally, the client devices 106 may be operated by users of a service 108 previously managed by a subscriber, and now at least partially managed by the service provider network 102. The users may be one or more of individual users, groups of users, organizations, businesses, or other entities that interact with the service provider network 102 via respective client devices 106. The client devices 106 may be any type of computing device capable of connecting to the service provider network 102 via a suitable data communications network 120 such as, but not limited to, a laptop or desktop computer, a tablet computing device, a server computer, or a mobile telephone. Additionally, the client devices 106 may have various components, algorithms, software, client applications, and so forth, to perform authentication methods with the virtual server 118. For instance, the client devices 106 may have a software client for communicating using various network protocols, including cryptographic network protocols, such as FTPS protocol STP protocol, Web Authentication (WebAuthn) protocol, Universal 2$^{nd}$ Factor (U2F) protocol, Universal Authentication Framework (UAF) protocol, and/or any other protocol.

To utilize the services of the subscriber that are now at least partially provided, supported, and/or managed by the service provider network 102, the client devices 106 may perform various authentication techniques with an authentication component 126 on the virtual server 118. Initially, the client devices 106 may, during pre-authentication, send an authentication request to the virtual server 118 over the network(s) 120. In some examples, the client devices 106 may attempt to access hostname(s) of a subscriber device 114 in the remote subscriber network 104, but be routed to the virtual server 118 via the mapping between the previous hostname for the subscriber device 114 and the virtual server 118. In some examples, the authentication request may be an attempted login for a user account and may include a username and/or a password for the user account. Upon receiving the authentication request that includes username and/or password, the authentication component 126 may determine that the client device 106 would like to be authenticated for interacting with a service 108. In some examples, the client devices 106 may attempt to login using a webpage provided by the management console 124.

Traditionally, the authentication component 126 may have access to a user directory that stores user account information that is usable to authenticate the client devices 106 and/or users according to various authentication methods. However, as noted above, the subscriber may desire to solely manage and maintain the user account information in a user directory 116.

In such examples, the subscriber may provide or supply one or more web-accessible functions or processes that retrieve user information needed to authenticate a client device 106 and/or user. For instance, the subscriber may supply one or more web APIs 122 (e.g., REST API(s)) that may be called by the authentication component 126 of the virtual server 118 to request various user data or information for authentication. In some examples, the web API 122 may be supplied at least partly as a service 108 of the service provider network 102. For instance, the service provider network 102 may include an API service 108 that allows the subscriber to create, publish, maintain, monitor, and secure APIs 122 at any scale. For instance, the subscriber may utilize the management console 124 to create the web API(s) 122 that act as a "front door" for the authentication component 126 (and the authorization component 128) to interface with a subscriber device 114. However, the web API 122 may additionally, or alternatively, be supplied by the subscriber through different means, and the subscriber may provide an indication of a function to call for the web API(s) 122 to receive authentication data from a subscriber 114. Although illustrated as a web API(s) 122, other communication means or interfaces may be provided to allow the virtual servers 118 to request user information from a subscriber device 114 in the remote subscriber network 104. For instance, the subscriber may define and provide one or more URLs that are accessible by the virtual server 118, utilize service-oriented applications by which data may be sent as asynchronous messages from one service endpoint to another, and/or any other means to access a network endpoint.

As another alternative to a web API 122, the service provider network 102 may utilize a rendezvous server (or other network endpoint) that serves as a mutually agreed meeting point between the service provider network 102 and the subscriber device 114. For instance, the subscriber device 114 may subscribe to a rendezvous server that is located in the network(s) 120 between the service provider network 102 and the subscriber device 114. The service provider network 102 and the subscriber device 114 may communicate back-and-forth with each other through the rendezvous server rather than through calls of web APIs 122 as described herein. Generally, any network endpoint that is accessible by the service provider network 102 and the subscriber device 114 may be utilized wherein the service provider network 102 does not need to log directly into an interface of the remote subscriber network 104. In this way, requests/challenges and responses may be communicated back-and-forth between the service provider network 102 and the subscriber device 114 using a network endpoint, such as a rendezvous server, as a third-party intermediary.

In some examples, the authentication component 126 of the virtual server 118 may call the web API 122 to request authentication information for the client device 106. In some examples, the API call through the API 122 may include input parameters to receive the username and/or password for the user account of the user of the client device 106. Generally, the web API 122 may map to, or otherwise be associated with, a network endpoint of the subscriber, such as a subscriber device 114 in the remote subscriber network 104. In some examples, the web API 122 may cause a function, process, code, application, etc., to execute on a subscriber device 114 based on the call through the web API 122. For instance, the web API 122 may cause code to execute on a subscriber device 114 to obtain, from the user directory 116, authentication data. The code may identify a user account based on the username and/or password included in the API call, and identify authentication data used to authenticate the client device 106 and/or user (e.g., public key(s), indication that the username and password are valid, etc.).

After obtaining the authentication data, the code on the subscriber device 114 may respond to the web API 122 request with authentication data for the client device 106 and/or user account. For instance, the web API 122 may return one or more public keys to the authentication component 126 to be used to authenticate the client device 106 using a cryptographic network protocol (e.g., asymmetric encryption, symmetric encryption, etc.). in some examples, the web API 122 may return an indication of whether the username and password are verified for a user account. For instance, if the client device 106 provides a valid username and password for an account, the code may return a "true" indicating that the user account associated with the client device 106 is authenticated as being valid. Further description of authenticating the client device is described in FIGS. 3-6.

After the client devices 106 has been authenticated (post-authentication), an authorization component 128 of the virtual server 118 may perform various operations for determining authorizations, or a set of permissions, granted to the authenticated user account for interacting with the services 108 associated with the subscriber. In some examples, in response to the call made through the web API 122, the code executing on the subscriber device 114 may return an indication of a set of permissions granted for the user account. For instance, the subscriber device 114 may return a role that is defined by the service provider network 102 as being associated with a set or permissions and/or restrictions. Additionally, the subscriber device 114 may indicate session credentials that are valid for, or expire after, a period of time. After the period of time, the authorization component 128 may need to request, via the web API 122, additional session credentials to continue the session.

In some examples, the set of permissions may be received in response to the same API call made for the authentication data. In other examples, the set of permissions may be received in response to a different API call made by the authorization component 128. After obtaining the role and credentials, the virtual server 118 may perform one or more operations requested by the client device 106. For instance, the virtual server 118 may read/write data to memory of the computing resources 112, add/remove instances of the computing resources 112, and/or perform other operations that are permitted by the set of permissions for the user account. In instances where session credentials are utilized that have an expiration time, and the amount of time required to perform the operation for the client device 106 exceeds the amount of time, the authorization component 128 may send another call through the web API 122 for additional session credentials to continue the operation.

The remote subscriber network 104 may be different than the service provider network 102 in that the devices and network connections of the remote subscriber network 104 are managed and/or owned by a subscriber that is different than the service provider that manages and/or owns the devices and network connections of the service provider network 102.

The authentication techniques described herein that are performed by the client device 106, virtual server 118, and/or subscriber device(s) 114 may include any type of authentication method or protocol known. For instance, the authentication techniques may include public-key cryptography authentication, password-based authentication, two-factor authentication, risk-based authentication, biometric authentication, text-string identifier authentication, one-time password authentication, out-of-band authentication, and/or any other type of authentication technique.

In some examples, the virtual server 118 may determine or select an authentication technique using a risk-based analysis for the client device 106 at the time of log in. For instance, the virtual server 118 may determine whether or not the client device and/or authorization request are risky, such as coming from an IP address that is unknown to the virtual server 118. If the IP address is a known address, they may allow a weaker type of authentication, such as a password-based authentication. If the IP address is unknown to the virtual server 118, the virtual server 118 may challenge the client device 106 and/or user for a key or pin. If the client device 106 and/or authorization request is more risky or suspicious, two or more authentication techniques may be used, and/or stronger authentication techniques may be used. Accordingly, the virtual server 118 may perform a risk-based assessment initially at the time of log in or authorization to determine one or more authentication methods to use for the client device 106.

The service supported at least partly by the virtual server 118 for allowing subscriber to manage their own user account information for authentication and/or authorization may be a multi-tenanted service. In other words, the virtual server 118 may support the techniques described herein for multiple subscribers, respective users and/or client devices 106, and respective services 108. To facilitate the multi-tenanted service, the virtual server 118 may initially determine which subscriber device 118 the server 118 may communicate to authenticate the requesting client device 106. The virtual server 118 may receive the authentication request from a client device 106, and determine an authentication server or device 114 that the client device 106 is requesting be used to authenticate the client device 106. The authentication request may notify the virtual server 106 of which subscriber device 114 and/or web API(s) 122 (or other network endpoint) are utilized to authenticate and/or authorize the client device 106. In this way, the virtual server 118 may support a multi-tenanted service for multiple subscribers with different users and user accounts. In some instances, the different tenants may utilize different authentication and/or authorization means that the virtual server 118 is configured to perform.

In some instances, the virtual server 118 may only perform authentication, but not authorization. For instance, the subscriber may instruct the service provider network 102 to perform authentication for client devices 106, but once authenticated, all the client devices 106 that interact with the service 108 and/or computing resource 112 associated with the subscriber may have the same authorization.

In some examples, the service provider network 102 may include a monitoring component 130 to track, monitor, and/or record different operations and/or actions taken by client devices 106 and user accounts and store them in the metrics 132. For example, the monitoring component 130 may allow subscribers to monitor their services 108 by collecting data in the form of logs, metrics, and events, and providing the subscribers with a unified view of the resources 112 and services 108 that are in the service provider network 102. The subscribers may utilize the metrics for auditing and/or other purposes.

Figure 2:
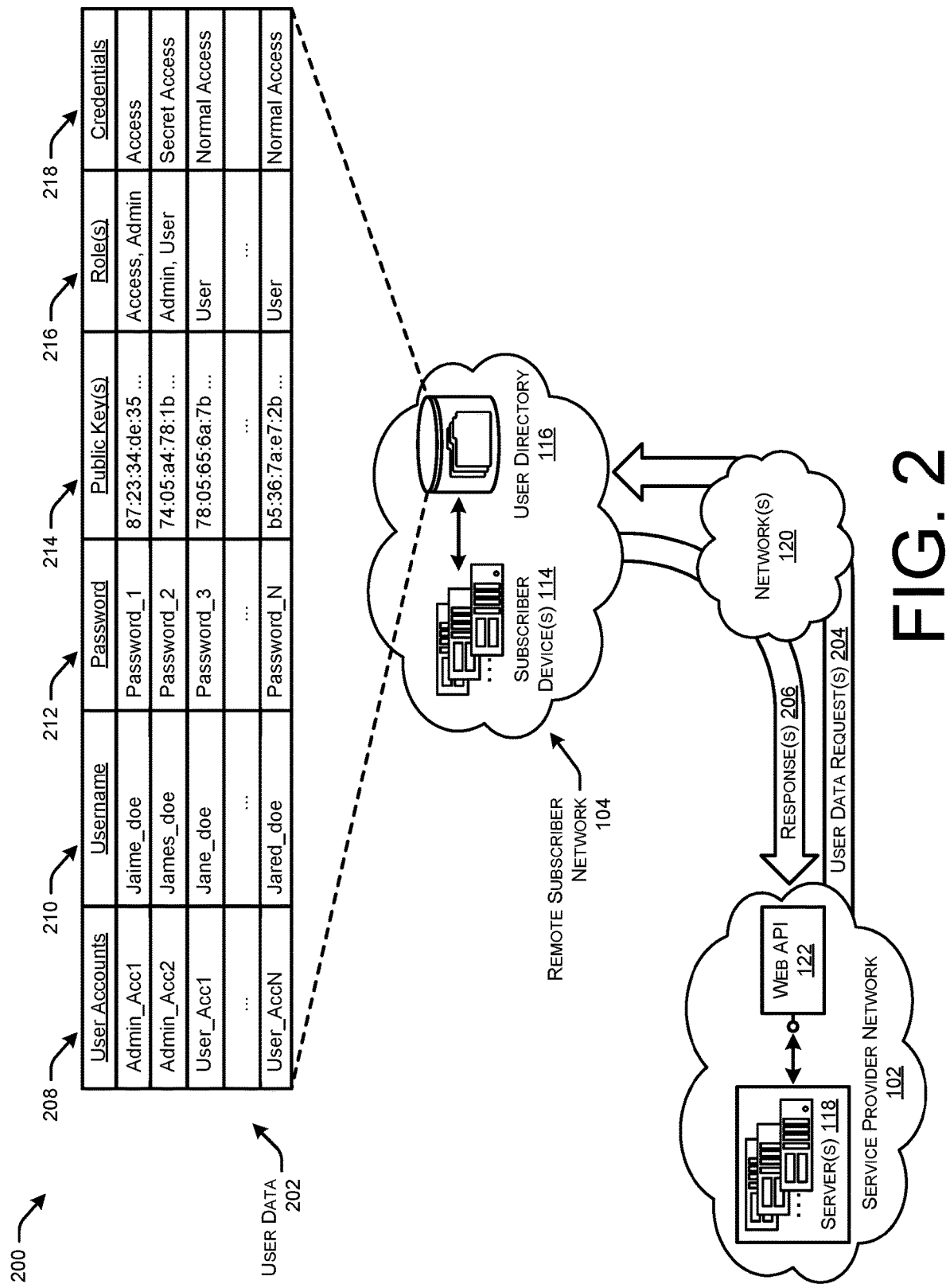
FIG. 2 illustrates a diagram of user information stored in a user directory at a remote subscriber network.

FIG. 2 illustrates a diagram 200 of user data 202 stored in a user directory 116 at a remote subscriber network 104. In some examples, the user data 202 may be stored in one or more user directories 116 that are located in a remote subscriber network 104 that is managed by a subscriber. As described above, the virtual server 118 may send one or more user data requests 204 in one or more calls using a web API 122, or other web-based communication means, to a network endpoint that is accessible to a subscriber device 114 in a remote subscriber network 104. The remote subscriber network 104 may include one or more the subscriber device(s) 114 and user directories 116 or databases that store user data 202 for user accounts 208.

The subscriber device(s) 114 may determine, based on the call from the web API 122, for which of the user accounts 208 the virtual server 118 is requesting data in the user data request(s) 204. For instance, the user data request(s) 204 (e.g., API call) may include a unique account identifier for the user account 208. The user directory 116 may include, for the user accounts 208 managed by the subscriber, information such as usernames 210, passwords 212, public key(s) 214 to authenticate client devices 106, one or more roles 216 that define one or more access permissions for the user accounts 208, and/or session credentials 218. The subscriber device(s) 114 may utilize the user data 202 to respond to the web API 122 call, such as by obtaining the appropriate user data 202 to respond to the request. As an example, the subscriber device(s) 114 may execute code that obtains public key(s) 214, role(s) 216, and/or session credentials 218 for a user account 208. In some examples, the subscriber device(s) 114 may execute code that determines whether the username 210 and/or password 210 received from the virtual server 118 is valid for a user account 208.

In some examples, the user accounts 208 may be associated with one role that defines one or more permissions that are granted to the user account 208, or multiple roles that each define various permissions granted to the user account 208. As an example, the roles 216 may be assigned to user accounts 208 to allow them to read data from particular resources 112, or write data to particular resources 112. The session credentials 218 may be provided to the virtual server 118 for use when the client device 106 is authenticated. For instance, the session credentials 218 may allow the client device 106 to interact with the services 108 during a session for at least a period of time. in some examples, the session credentials 218 may be associated with an expiration time or only be valid for a predefined period of time. In such examples, the virtual servers 118 may request additional session credentials 218 if the session credentials 218 are going to expire before the operation being performed for the client device 106 is complete. In some examples, the user data 202 may include additional data, such as an office location of a user of the user account 208, a state the user lives in, a first and/or last name of the user, whether the user is in a foreign country for jurisdiction issues, and so forth.

Depending on the type of authentication and/or authorization, the code executing on the subscriber device(s) 114 may send one or more responses 206 that includes the requested information for authentication and/or authorization requests. The responses(s) 206 may include any user data 202 included in the user directory 116, and/or other data, such as indications that a username 210 and/or password 212 combination is valid for a user account 208, one or more public keys 214, one or more roles 216, credentials 218, and any other data.

Figure 3:
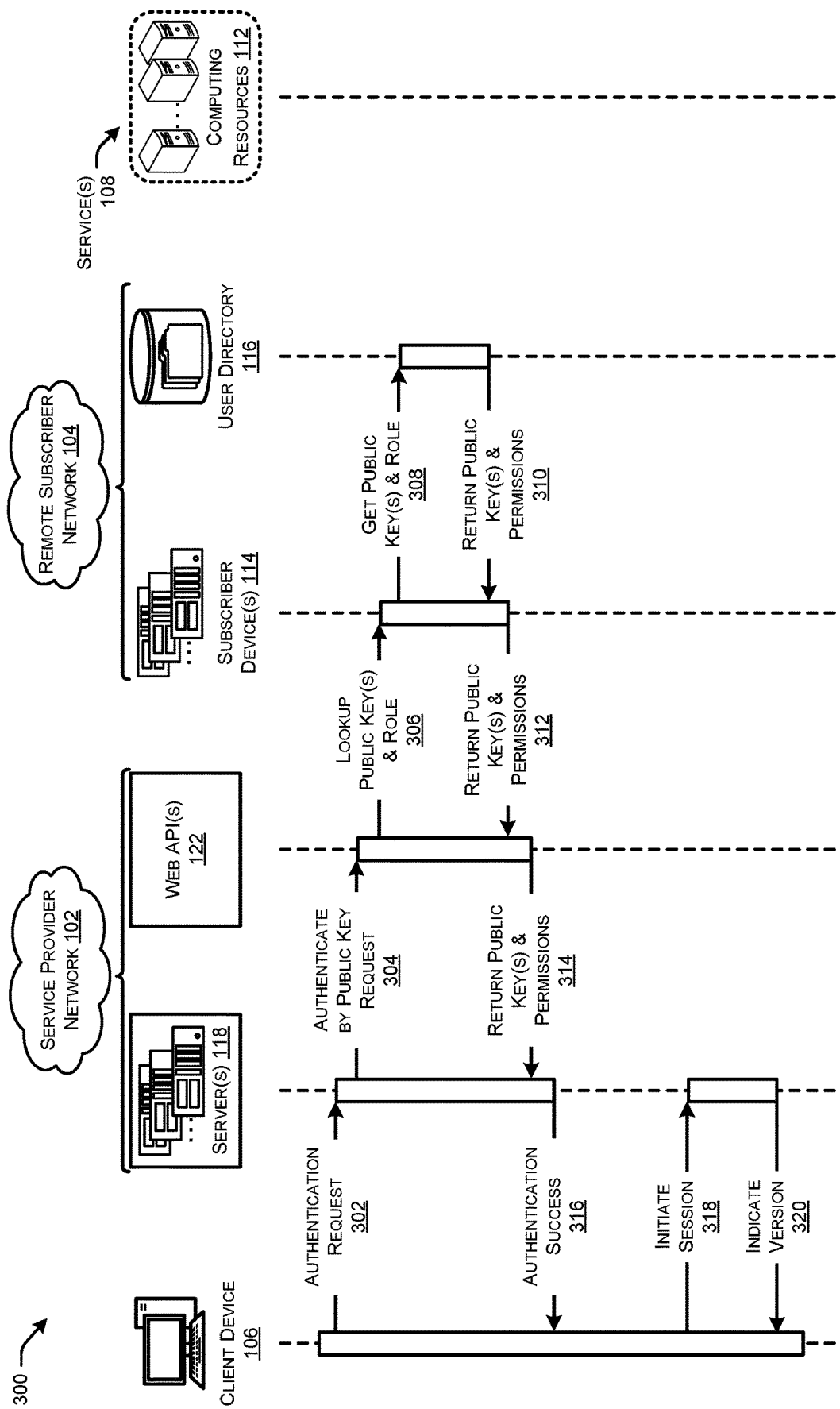
FIG. 3 illustrates a sequence diagram illustrating an example flow of interactions arranged in a time sequence for obtaining a public key from a remote subscriber device to authenticate a client device using public key authentication protocols.

FIG. 3 illustrates a sequence diagram 300 illustrating an example flow of interactions arranged in a time sequence for obtaining a public key 214 from a remote subscriber device 114 to authenticate a client device 106 using public key authentication protocols.

At 302, the client device 106 may send an authentication request to a virtual server 118. In some instances, the request may be associated with a user of the client device 106 attempting to log in to a management console 124 for the service 108. At 304, the virtual server 118 may call the web API(s) 122 with a request to authenticate the client device 106 using a public key authentication technique. At 306, the web API 122 may pass the call to a network endpoint associated with the subscriber device 114. The subscriber device 114 may have code executing thereon which performs a get operation at 308 to obtain one or more public keys 214 and an indication of a role 216 (or another indication of a set of permission) for the client device 106.

At 310, the subscriber device 114 may obtain, receive, access, have returned, etc., the public key(s) 214 and role(s) 216 for the user account 208 of the client device 106. The subscriber device 114 may respond to the web API call at 312 by returning the public key(s) 214 and role(s) 216 for the user account 208, and the web API 122 may return the public key(s) 214 and role(s) 216 to the virtual server 118 at step 314. At 316, the virtual server may perform any type of public-key cryptography method or protocol with the client device 106 using the public key(s) 214 to authenticate the client device 106. The client device 106 and the virtual server 118 may be configured to perform any type of public-key cryptographic protocol or method.

At 318, the client device 106 may initiate a session with the virtual server 118 whereby communications are encrypted over the network(s) 120. At 320, the server 118 may indicate the version(s) of the cryptographic protocol that it supports.

Figure 4:
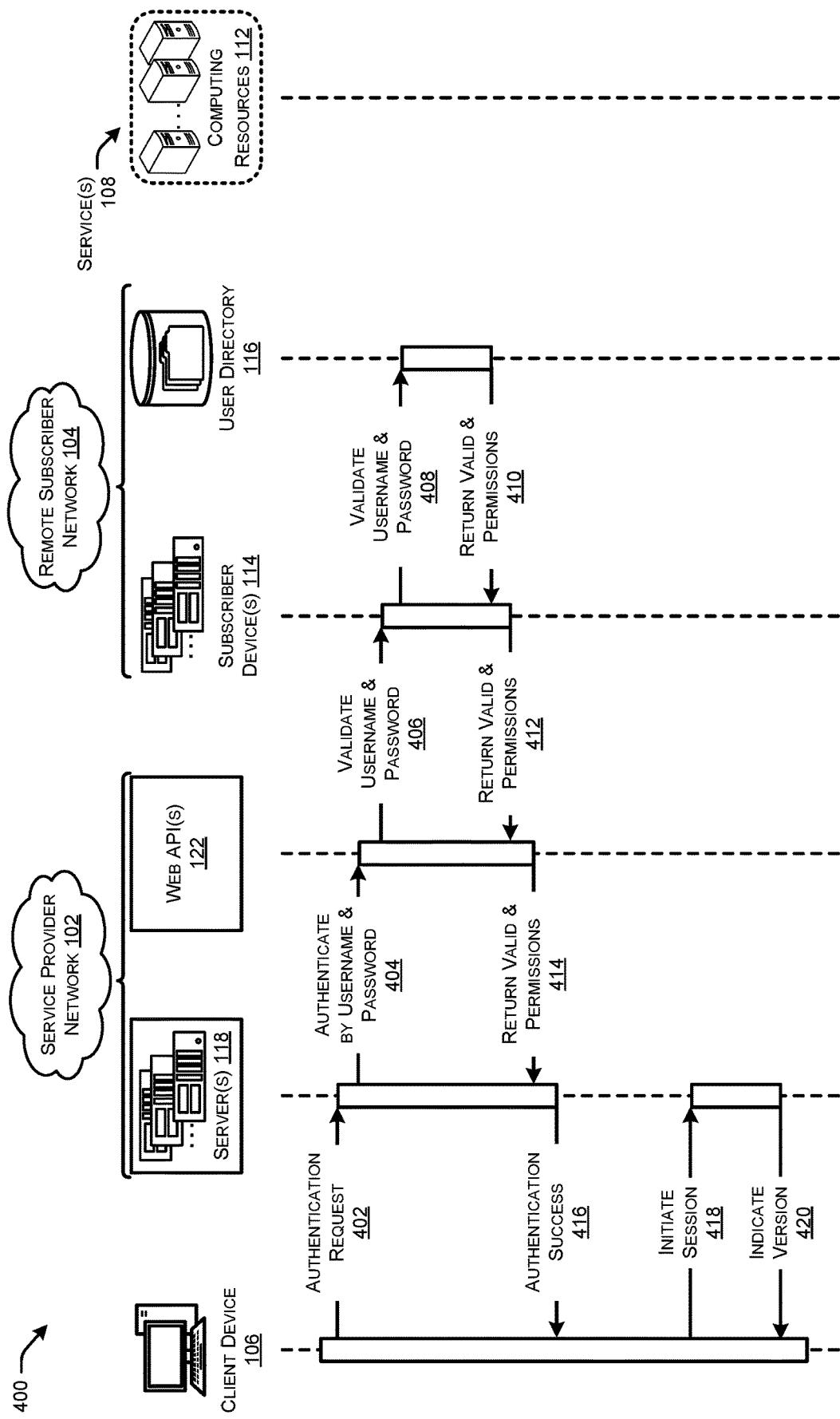
FIG. 4 illustrates a sequence diagram illustrating an example flow of interactions arranged in a time sequence for communicating a received username and password to a remote subscriber device to authenticate a user of a client device.

FIG. 4 illustrates a sequence diagram 400 illustrating an example flow of interactions arranged in a time sequence for communicating a received username 210 and password 212 to a remote subscriber device 114 to authenticate a user of a client device 106.

At 402, the client device 106 may send an authentication request to a virtual server 118. In some instances, the request may be associated with a user of the client device 106 attempting to log in to a management console 124 for the service 108. The request may include a username 210 and a password 212 for a user account 208. At 404, the virtual server 118 may call the web API(s) 122 with a request to authenticate the client device 106 using the username 210 and password 212. At 406, the web API 122 may pass the call to a network endpoint associated with the subscriber device 114. The subscriber device 114 may have code executing thereon which performs a get operation at 408 to query the user directory 112 to validate the username 210 and password 212.

At 410, the subscriber device 114 may obtain, receive, access, have returned, etc., an indication that the username 210 and password 212 are valid and role(s) 216 for the user account 208 of the client device 106. The subscriber device 114 may respond to the web API call at 412 by returning an indication that the username 210 and password are valid for a user account 208, and role(s) 216 for the user account 208. At 414, the web API 122 may return the indication of valid and role(s) 216 to the virtual server 118. At 416, the virtual server 118 indicate to the client device 106 that it has successfully been authenticated. At 418, the client device 106 may initiate a session with the virtual server 118 whereby communications are encrypted over the network(s) 120. At 420, the server 118 may indicate the version(s) of the cryptographic protocol that it supports.

Figure 5:
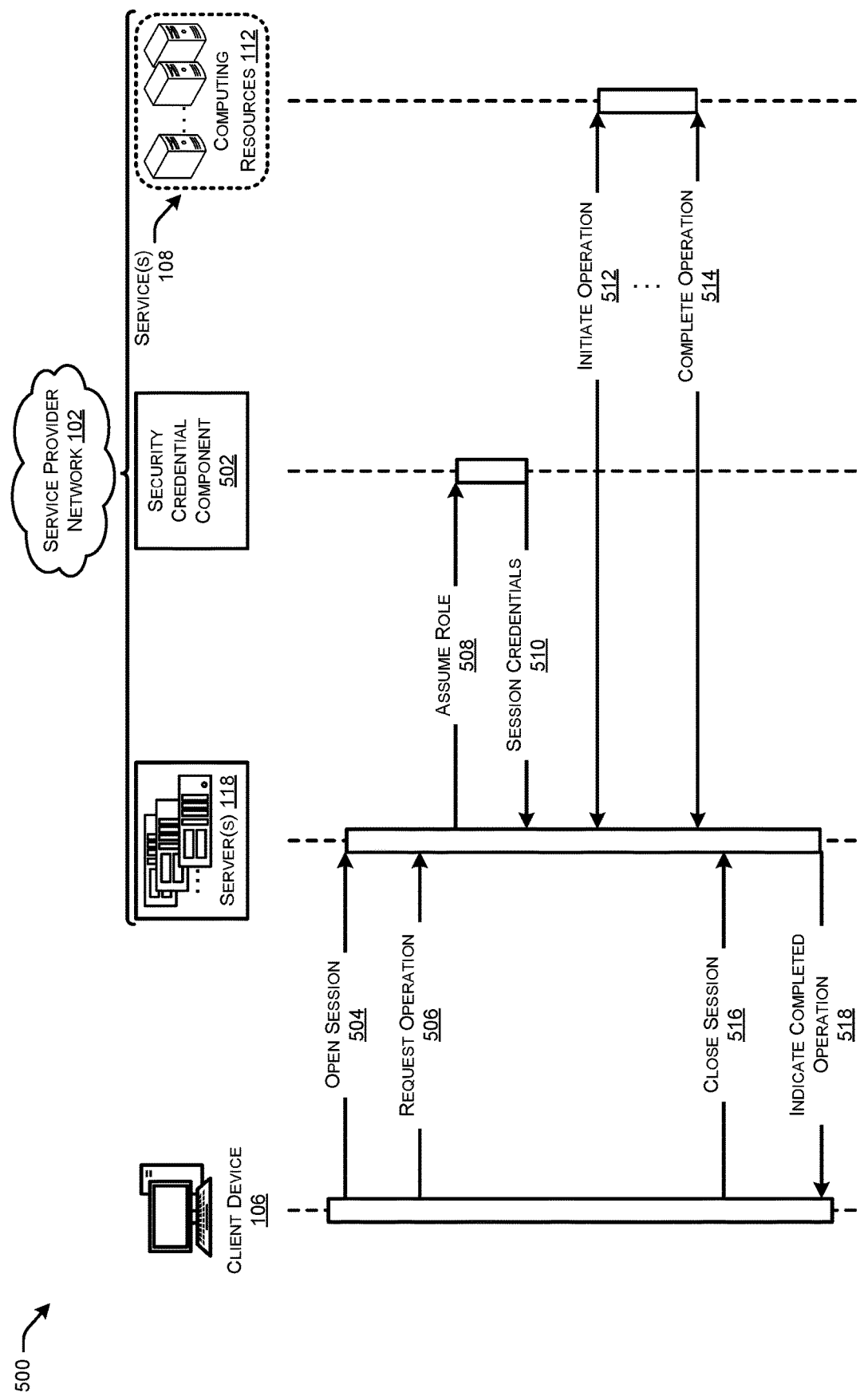
FIG. 5 illustrates a sequence diagram illustrating an example flow of interactions arranged in a time sequence for performing an operation with a service of a service provider network on behalf of a client device based on a set of permissions granted to a user account that were indicated by a remote subscriber device.

FIG. 5 illustrates a sequence diagram 500 illustrating an example flow of interactions arranged in a time sequence for performing an operation with a service 108 of a service provider network 102 on behalf of a client device 106 based on a set of permissions granted to a user account 208 that were indicated by a remote subscriber device 114. In FIG. 5, the set of permissions are indicated by the remote subscriber device 114 in response to sending a single authentication and authorization request to a network endpoint. The service provider network 502 may include a security credential component 502, such as an identity and access management (IAM) component. The security credential component 502 may be configured to determine, based on role(s) 216 of a user account 208, permissions to allow and deny access to the computing resources 112 and/or allow and deny operations performed on the computing resources 112. In some examples, operations or steps described in FIG. 5 may be performed after the client device 106 has been authenticated.

At 504, the client device 106 may open a session with the virtual server 118. The client device 106 may open the communication session at 504 using any network communicating protocol. At 506, the client device 506 may request that the virtual server 106 perform an operation for interacting with the computing resources 112 and/or services 108 (e.g., read/write data to storage, add/remove a computing resource 112, etc.). At 508, the virtual server 118 may assume the role 216 for the user account 208 used to log in by the client device 106. In this way, the virtual server 118 may perform operations on behalf of the user of the client device 106 that are permitted by the role 216 for the user account 208. At 510, the security credential component 502 may return or provide session credentials 218 to the virtual server 118 to perform the operation in the session. In some examples, the session credentials 218 may expire after a period of time.

At 512, the virtual server 118 may perform the operation that is permitted by the access permission of the role 216, and at 514 the virtual server 118 may complete the operation. In some examples, the virtual server 118 may have requested and received updated session credentials 218 from the subscriber device 114 if the operation took longer than the expiration time of the original session credentials 218. At 516, the client device may close the session when the user is finished interacting with the service 108, and at 518 the virtual server 118 may indicate to the client device 106 that the operation has been completed. In some examples, additional communications and/or steps may be performed than those described in FIG. 5.

Figure 6:
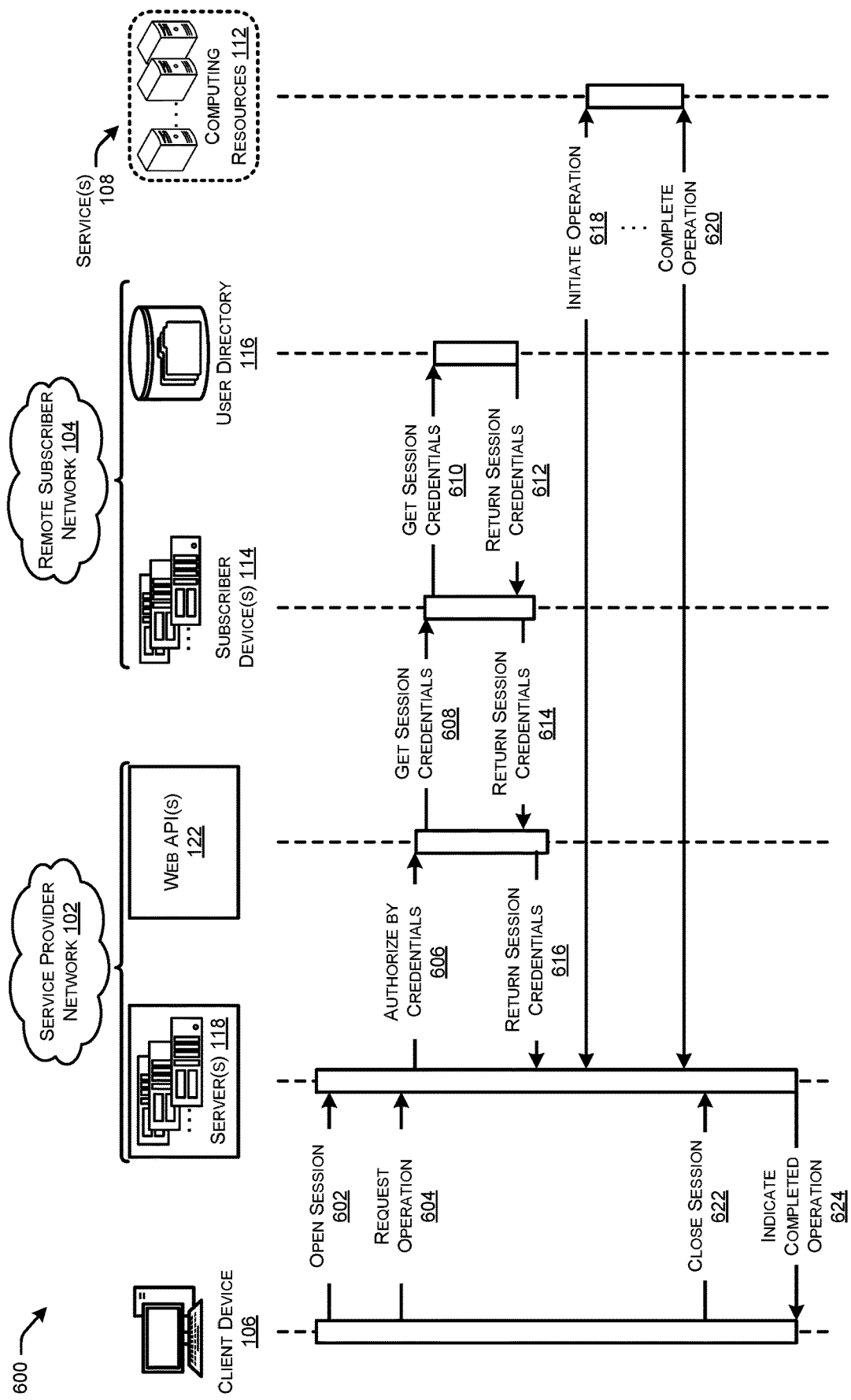
FIG. 6 illustrates a sequence diagram illustrating an example flow of interactions arranged in a time sequence for performing an operation with a service of a service provider network on behalf of a client device based on a set of permissions granted to a user account that were indicated by a remote subscriber device.

FIG. 6 illustrates a sequence diagram 600 illustrating an example flow of interactions arranged in a time sequence for performing an operation with a service 108 of a service provider network 102 on behalf of a client device 106 based on a set of permissions granted to a user account 208 that were indicated by a remote subscriber device 114. In FIG. 6, the set of permissions are indicated by the remote subscriber device 114 in response to sending an additional authorization request to a network endpoint after an initial authentication request. In some examples, operations or steps described in FIG. 6 may be performed after the client device 106 has been authenticated.

At 602, the client device 106 may open a session with the virtual server 118. The client device 106 may open the communication session at 602 using any network communicating protocol. At 604, the client device 506 may request that the virtual server 106 perform an operation for interacting with the computing resources 112 and/or services 108 (e.g., read/write data to storage, add/remove a computing resource 112, etc.). At 606, the virtual server 118 request, using an API call of the web API 122, to authorize the user account 208 by credentials 218. At 608, the web API 122 may send a request to a subscriber device 114 to get session credentials 218 for the user account 208. At 610, the subscriber device 114 may get the session credentials 218 from the user directory 116. At 612, 614, and 616, the subscriber device 114 may return the session credentials 218 to the server 118 using the web API 122.

At 618, the virtual server 118 may initiate the operation that is permitted by the access permission of the role 216, and at 620 the virtual server 118 may complete the operation. In some examples, the virtual server 118 may have requested and received updated session credentials 218 from the subscriber device 114 if the operation took longer than the expiration time of the original session credentials 218. At 622, the client device may close the session when the user is finished interacting with the service 108, and at 624 the virtual server 118 may indicate to the client device 106 that the operation has been completed. In some examples, additional communications and/or steps may be performed than those described in FIG. 6.

Figure 7:
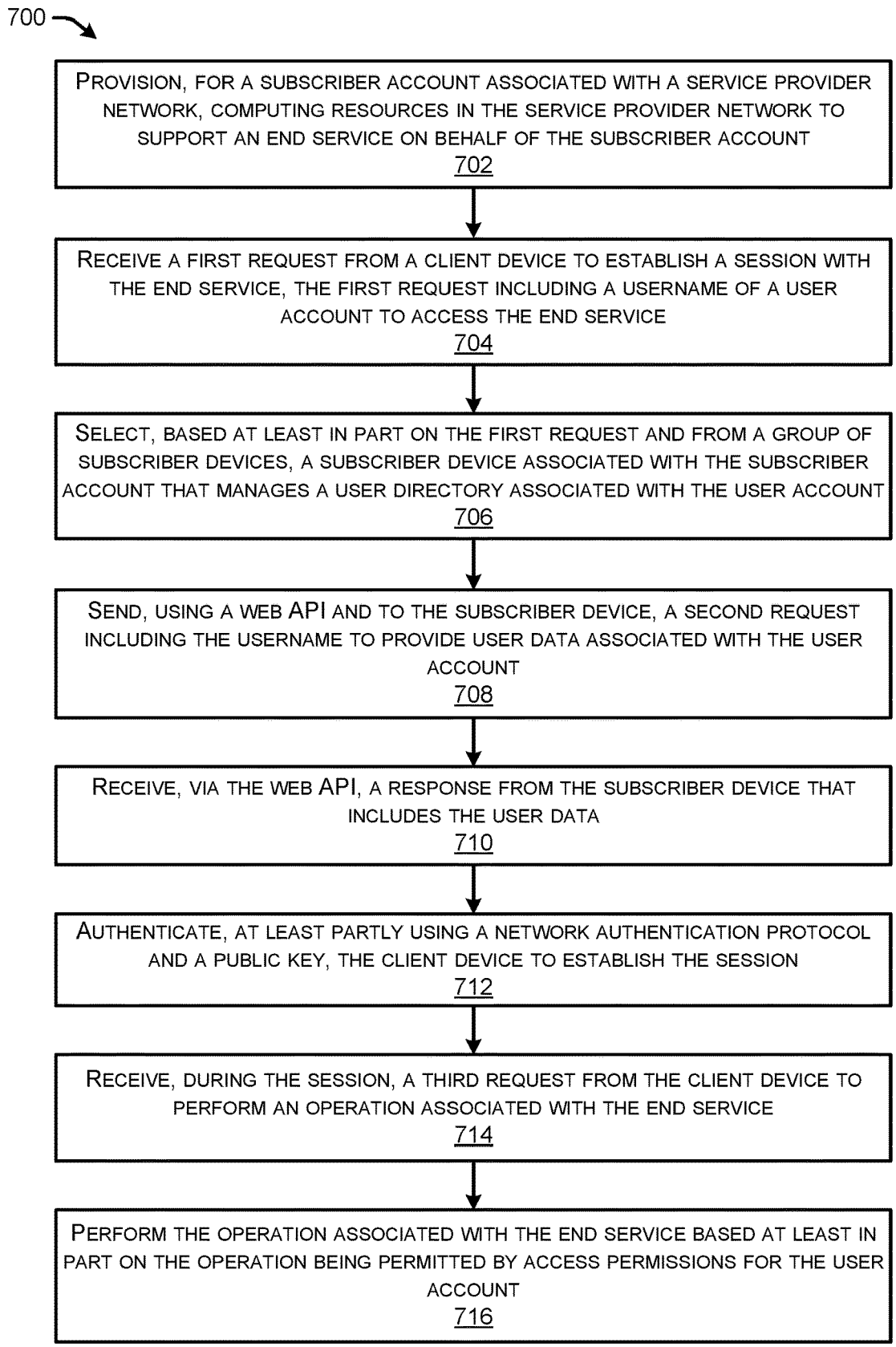
FIG. 7 illustrates a flow diagram of an example method performed by a service provider network for performing authentication and determining authorization using user information received in response to a call to a web API requesting user information from a remote subscriber device.
Figure 8:
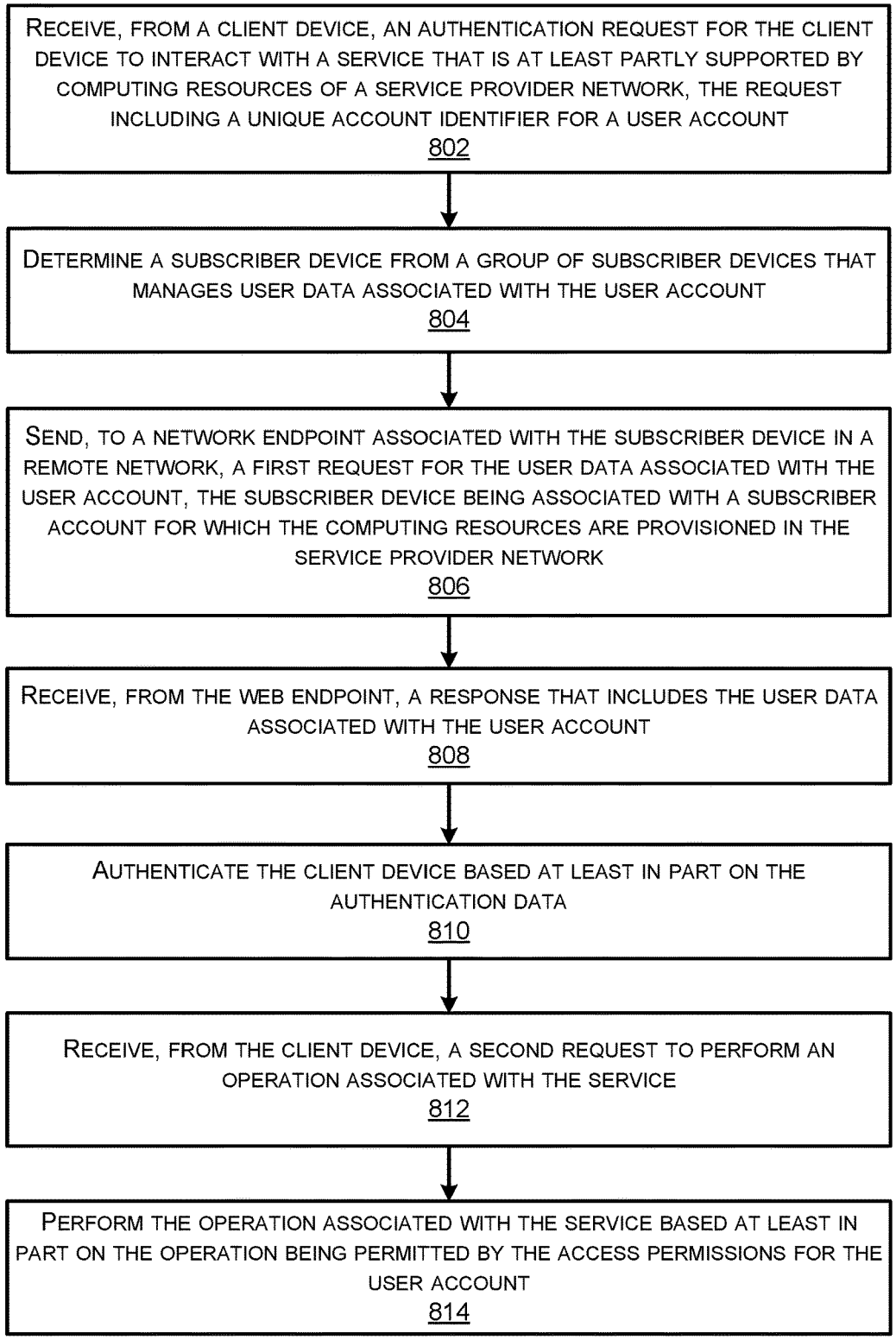
FIG. 8 illustrates another flow diagram of an example method performed by a service provider network for performing authentication and determining authorization using user information received in response to sending one request to a network endpoint for user data from a remote subscriber device.
Figure 9:
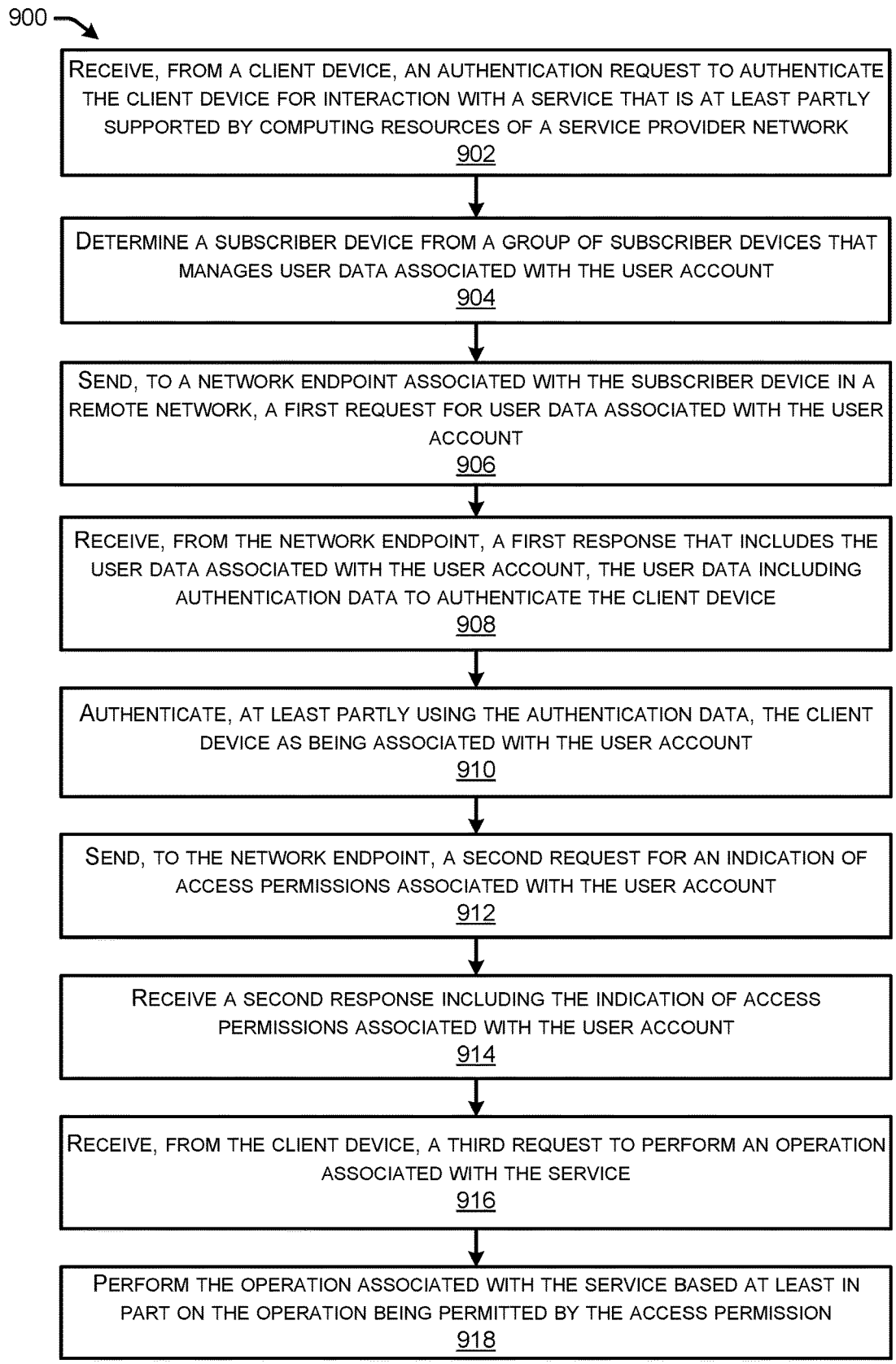
FIG. 9 illustrates a flow diagram of an example method performed by a service provider network for performing authentication using authentication data received in response to sending a first request to a network endpoint, and determining authorization using an indication of a set of permissions granted to a user account received in response to sending a second request to the network endpoint.

FIGS. 7, 8, and 9 illustrate flow diagrams of example methods 700, 800, and 900 that illustrate aspects of the functions performed at least partly by the service provider network 102 as described in FIGS. 1-6. The logical operations described herein with respect to FIGS. 7, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 illustrates a flow diagram of an example method 700 performed by a service provider network 102 for performing authentication and determining authorization using user information received in response to a call to a web API requesting user information from a remote subscriber device 114.

At 702, the service provider network 102 may provision, for a subscriber account associated with the service provider network 102, computing resources 112 in the service provider network 102 to support an end service 108 on behalf of the subscriber account. For instance, the subscriber account may request that a service be provisioned, and/or migrate their existing service from on-premise devices of the subscriber to the service provider network 102.

At 704, the service provider network 102 may receive a first request from a client device 106 to establish a session with the end service 108. In some instances, the first request may include a unique account identifier (e.g., username) of a user account to access the end service 108. Further, the first request may include an indication of the subscriber device 114 and/or network endpoint that is utilized to authenticate the client device 106.

At 706, the service provider network 102 may select, based at least in part on the first request and from a group of subscriber devices, a subscriber device associated with the subscriber account that manages a user directory associated with the user account. For instance, the service provider network 102 may determine which subscriber device 114 to utilize for a subscriber that the user is associated with from amongst the different subscribers that are supported by the service provider network 102. Further, the service provider network 102 may determine that the subscriber account manages their own user directory 116 and needs to be communicated with to authenticate the client device 106.

At 708, the service provider network 102 may send, using a web API 122 and to the subscriber device 114, a second request including the unique account identifier to provide user data associated with the user account. In some examples, the user data 202 may be stored in the user directory 116 that is accessible by the subscriber device 114 (e.g., on-premise, remote from the network 104, etc.).

At 710, the service provider network 102 may receive, via the web API, a response from the subscriber device that includes the user data. The user data may include authentication data to authenticate the client device (e.g., public key, password validation, etc.), and an indication of access permissions (e.g., role) for the user account to interact with the end service.

At 712, the service provider network 102 may authenticate, based at least in part on the authentication data, the client device to establish the session. For instance, the virtual server 118 may perform an authentication method with the client device 106 using a public key.

At 714, the service provider network 102 may receive, during the session, a third request from the client device to perform an operation associated with the end service. The operation may be any type of operation, such as reading/writing data to the resources 112, adding/removing a resource 112, and/or interacting with the service 108 provided by the service provider network 102 on behalf of the subscriber.

At 716, the service provider network 102 may perform the operation associated with the end service based at least in part on the operation being permitted by the access permissions for the user account. For instance, the service provider network 102 may assume the role of the user account to perform the operation during the session that may be established using session credentials.

In some examples, the first request received from the client device further includes a password for the user account, the second request send to the subscriber device further includes the password, the user data included in the response further includes an indication that the password is valid for the user account, and authenticating the client device to establish the session is based at least in part on the password being valid for the user account.

The techniques of method 700 may be performed by a system associated with or included in the service provider network 102. The system may be associated with a first network of the service provider network 102, the subscriber device and the user directory may be associated with a second network that is remote from the first network of the service provider network, and sending, using the web API, the second request to the subscriber device comprises sending the second request from the first network to a network endpoint positioned between the first network and the second network. Ultimately, a request is communicated to a subscriber device 114 is the second network.

FIG. 8 illustrates another flow diagram of an example method 800 performed by a service provider network 102 for performing authentication and determining authorization using user information received in response to sending one request to a network endpoint for user data from a remote subscriber device.

At 802, the service provider network 102 may receive, from a client device, an authentication request to authenticate the client device for interaction with a service that is at least partly supported by computing resources of the service provider network, the authentication request including a unique account identifier for a user account associated with the service. In some instances, the first request may include a unique account identifier (e.g., username) of a user account to access the end service 108. Further, the first request may include an indication of the subscriber device 114 and/or network endpoint that is utilized to authenticate the client device 106.

At 804, the service provider network 102 may determine a subscriber device from a group of subscriber devices that manages user data associated with the user account. For instance, the service provider network 102 may determine which subscriber device 114 to utilize for a subscriber that the user is associated with from amongst the different subscribers that are supported by the service provider network 102. Further, the service provider network 102 may determine that the subscriber account manages their own user directory 116 and needs to be communicated with to authenticate the client device 106.

At 806, the service provider network 102 may send, to a network endpoint associated with the subscriber device in a remote network, a first request including the unique account identifier to provide the user data associated with the user account. In some examples, the subscriber device 114 is associated with a subscriber account for which the computing resources 112 are provisioned in the service provider network.

At 808, the service provider network 102 may receive, from the network endpoint, a response that includes the user data associated with the user account. In some examples, the user data includes authentication data to authenticate the client device. At 810, the service provider network 102 may authenticate, at least partly using the authentication data, the client device as being associated with the user account.

At 810, the service provider network 102 may receive, from the client device, a second request to perform an operation associated with the service. At 812, the service provider network 102 may perform the operation associated with the service.

In some examples, the response comprises a first response, the method 800 may further include sending a third request for an indication of access permissions associated with the user account, and receiving a second response including the indication of the access permissions associated with the user account. In such examples, the operation performed is permitted by the access permissions. In some instances, the access permissions comprise first access permissions, the second response further includes one or more variables associated with a policy document that defines second access permissions associated with the user account, and the operation performed is further permitted by the second access permissions. In this way, the subscriber may define a scope down policy for a role of a user account to grant or disallow various permissions.

In some instances, the method 800 may include determining a risk event associated with at least one of the client device or the authentication request, and selecting an authentication method for the authenticating the client device based at least in part on the risk event. For instance, the virtual server 118 may determine whether or not the client device and/or authorization request are risky, such as coming from an IP address that is unknown to the virtual server 118. If the IP address is a known address, they may allow a weaker type of authentication, such as a password-based authentication. If the IP address is unknown to the virtual server 118, the virtual server 118 may challenge the client device 106 and/or user for a key or pin. If the client device 106 and/or authorization request is more risky or suspicious, two or more authentication techniques may be used, and/or stronger authentication techniques may be used. Accordingly, the virtual server 118 may perform a risk-based assessment initially at the time of log in or authorization to determine one or more authentication methods to use for the client device 106.

FIG. 9 illustrates a flow diagram of an example method 900 performed by a service provider network 102 for performing authentication using authentication data received in response to sending a first request to a network endpoint, and determining authorization using an indication of a set of permissions granted to a user account received in response to sending a second request to the network endpoint.

At 902, a service provider network 102 may receive, from a client device, an authentication request for the client device to interact with a service that is at least partly supported by computing resources of a service provider network, the request including a unique account identifier for a user account associated with the service.

At 904, the service provider network 102 may determine a subscriber device from a group of subscriber devices that manages user data associated with the user account. At 906, the service provider network 102 may send, to a network endpoint associated with the subscriber device in a remote network, a first request for the user data associated with the user account, the subscriber device being associated with a subscriber account for which the computing resources are provisioned in the service provider network.

At 908, the service provider network 102 may receive, from the network endpoint, a response that includes the user data associated with the user account. The user data may include authentication data to authenticate the client device and an indication of access permissions for the user account to interact with the service.

At 910, the service provider network 102 may authenticate the client device based at least in part on the authentication data. At 912, the service provider network 102 may receive, from the client device, a second request to perform an operation associated with the service, and at 914, the service provider network 102 may perform the operation associated with the service based at least in part on the operation being permitted by the access permissions for the user account.

Figure 10:
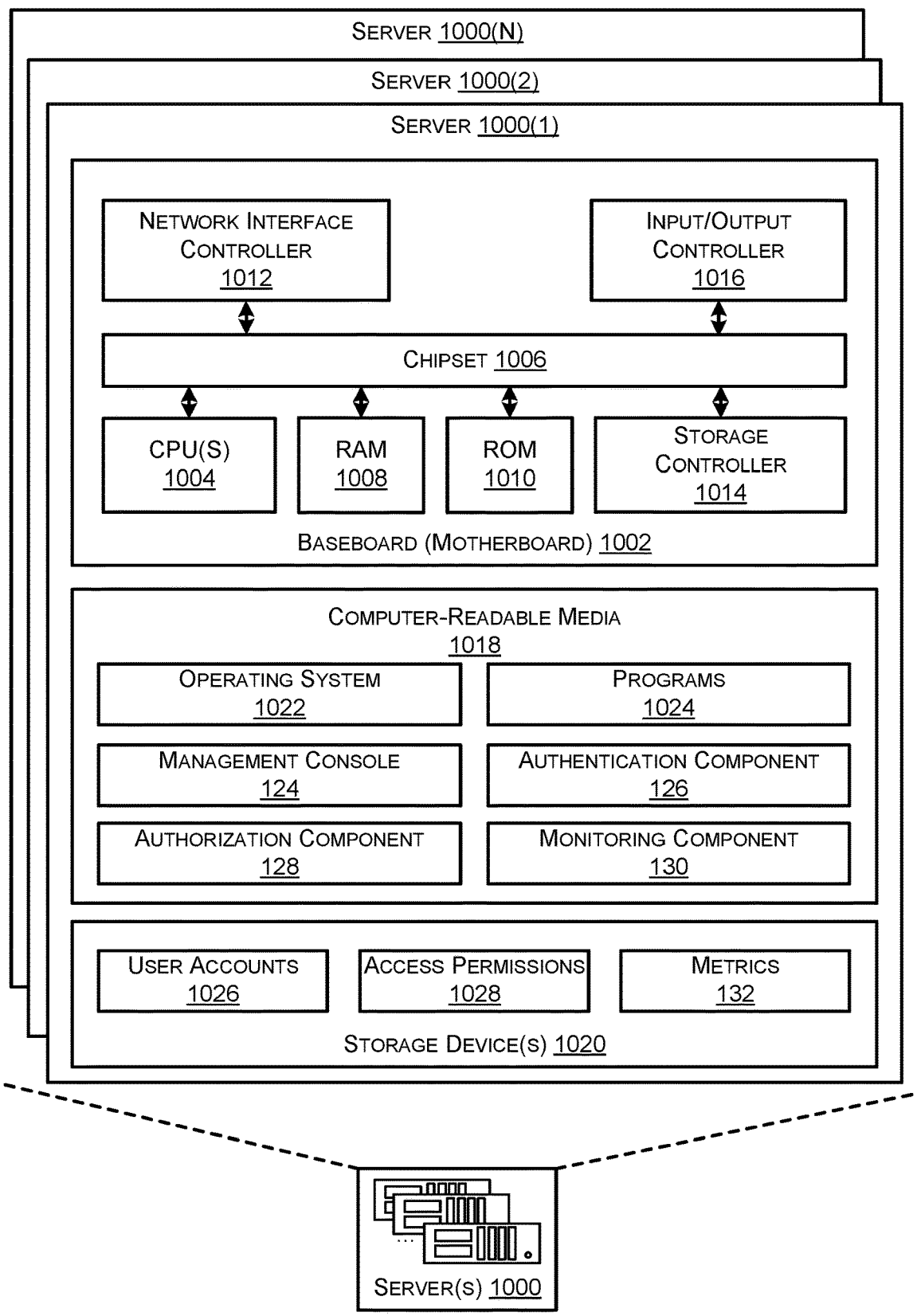
FIG. 10 is a computer architecture diagram showing an illustrative computer hardware architecture for implementing one or more server devices that can be utilized to implement aspects of the various technologies presented herein.

FIG. 10 is a computer architecture diagram showing illustrative hardware and software architecture for implementing one or more server devices 1000 that can be utilized to implement aspects of the various technologies presented herein. The computer architecture shown in FIG. 10 illustrates a conventional server computer, workstation, desktop computer, laptop, tablet, network appliance, e-reader, smartphone, or other computing device, and can be utilized to execute any of the software components presented herein.

The server 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the server 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the server 1000. The chipset 1006 can further provide an interface to a computer-readable storage medium such as a read-only memory ("ROM") 1010 or non-volatile RAM ("NVRAM") for storing basic routines that help to startup the server 1000 and to transfer information between the various components and devices. The ROM 1010 or NVRAM can also store other software components necessary for the operation of the server 1000 in accordance with the configurations described herein.

The server 1000 can operate in a networked environment using logical connections to remote computing devices and computer systems through a network, such as the network 1008. The chipset 1006 can include functionality for providing network connectivity through a NIC 1012, such as a gigabit Ethernet adapter. The NIC 1012 is capable of connecting the servers 1000 to other computing devices over the network 1008 (or 120). It should be appreciated that multiple NICs 1012 can be present in the server 1000, connecting the computer to other types of networks and remote computer systems.

The server 1000 can be connected to one or more computer-readable media 1018 storing software components for the server devices 1000, and one or more mass storage devices 1020 for storing data. The computer-readable media 1018 can store an operating system 1022, programs 1024, and data, which have been described in greater detail herein. The mass storage device 1020 can be connected to the server 1000 through a storage controller 1014 connected to the chipset 1006. The mass storage device 1020 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable media 1018 may store the components described herein as executable, computer-readable instructions. For instance, the components may include the management console 124, authentication component 126, authorization component 128, and/or monitoring component 130. The components may be stored and/or executed on a single server, or on a system of two or more severs 1000.

The server 1000 can store data on the mass storage device 1020 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1020 is characterized as primary or secondary storage, and the like.

For example, the server 1000 can store information to the mass storage device 1020 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server 1000 can further read information from the mass storage device 1020 by detecting the physical states or characteristics of one or more particular locations within the physical storage units.

In addition to the mass storage device 1020 described above, the server 1000 can have access to the computer-readable storage media 1018 to store and retrieve information, such as program modules, data structures, or other data. It should be appreciated by those skilled in the art that computer-readable storage media is any available media that provides for the non-transitory storage of data and that can be accessed by the server 1000. In some examples, the operations performed by the service provider network 102, and or any components included therein, may be supported by one or more devices similar to server 1000. Stated otherwise, some or all of the operations performed by the service-provider network 102, and or any components included therein, may be performed by one or more computer devices 1000 operating in a cloud-based arrangement. As shown, the storage device 1020 may store user accounts 1026 for the different users of subscribers, and access permissions 1028 that are defined for the different user accounts 1026.

By way of example, and not limitation, computer-readable storage media 1018 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1020 can store an operating system 1022 utilized to control the operation of the server 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1020 can store other system or application programs and data utilized by the server 1000.

In one embodiment, the mass storage device 1020 or other computer-readable storage media 1018 is encoded with computer-executable instructions which, when loaded into the server 1000, transform the computer from a general-purpose computing system into a special-purpose computer capable of implementing the embodiments described herein. These computer-executable instructions transform the server 1000 by specifying how the CPUs 1004 transition between states, as described above. According to one embodiment, the server 1000 has access to computer-readable storage media storing computer-executable instructions which, when executed by the server 1000, perform the various processes described above with regard to FIGS. 1-9. The server 1000 can also include computer-readable storage media having instructions stored thereupon for performing any of the other computer-implemented operations described herein.

The server 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the server 1000 might not include all of the components shown in FIG. 10, can include other components that are not explicitly shown in FIG. 10, or might utilize an architecture completely different than that shown in FIG. 10.

In various examples, the service provider network may be part of or associated with a cloud-based service network that can be configured to implement aspects of the functionality described herein.

The service-provider network 102 can provide computing resources 112, like VM instances and storage, on a permanent or an as-needed basis. Among other types of functionality, the computing resources 112 provided by the service-provider network 102 may be utilized to implement the various services described above. The computing resources provided by the service-provider network 102 can include various types of computing resources, such as data processing resources like VM instances, data storage resources, networking resources, data communication resources, application-container/hosting services, network services, and the like.

Each type of computing resource provided by the service-provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service-provider network 102 can also be configured to provide other types of computing resources not mentioned specifically herein.

The computing resources 112 provided by the service-provider network 102 may be enabled in one embodiment by one or more data centers 110 (which might be referred to herein singularly as "a data center 110" or in the plural as "the data centers 110"). The data centers 110 are facilities utilized to house and operate computer systems and associated components. The data centers 110 typically include redundant and backup power, communications, cooling, and security systems. The data centers 110 can also be located in geographically disparate locations.

The data centers 110 may be configured in different arrangements depending on the service-provider network 102. For example, one or more data centers 110 may be included in or otherwise make-up an availability zone. Further, one or more availability zones may make-up or be included in a region. Thus, the service-provider network 102 may comprise one or more availability zones, one or more regions, and so forth. The regions may be based on geographic areas, such as being located within a predetermined geographic perimeter.

The users and/or admins of the service-provider network 102 may access the computing resources 112 provided by the data centers 110 of the service-provider network 102 over any wired and/or wireless network(s) 120 (utilizing a client device 106 and/or another accessing-user device), which can be a wide area communication network ("WAN"), such as the Internet, an intranet or an Internet service provider ("ISP") network or a combination of such networks. For example, and without limitation, a device operated by a user of the service provider network 102 may be utilized to access the service-provider network 102 by way of the network(s) 120. It should be appreciated that a local-area network ("LAN"), the Internet, or any other networking topology known in the art that connects the data centers 110 to remote clients and other users can be utilized. It should also be appreciated that combinations of such networks can also be utilized.

In various examples, the data centers 110 may include computing resources 112 that are supported by different types of devices, such as servers 1000. A data center 110 may include several server computers 1000 (which might be referred to herein singularly as "a server computer 1000" or in the plural as "the server computers 1000") for providing computing resources 112. In some examples, the resources 112 and/or server computers 1000 may include, or correspond to, the computing resources 112 described herein.

The server computers 1000 can be standard tower, rack-mount, or blade server computers configured appropriately for providing the computing resources described herein. As mentioned above, the computing resources provided by the service-provider network 102 can be data processing resources such as VM instances or hardware computing systems, database clusters, computing clusters, storage clusters, data storage resources, database resources, networking resources, and others. Some of the servers 1000 can also be configured to execute the various components of the server(s) 118 capable of authenticating client devices 106 and/or determining authorizations for users of the client devices 106. In the case of VM instances, for example, the servers 118 may include or be a hypervisor or another type of program configured to enable the execution of multiple VM instances on a single server computer 1000. Server computers 1000 in the data center 110 can also be configured to provide network services and other types of services.

In the example data center 110 shown in FIG. 1, an appropriate LAN is also utilized to interconnect the server computers 1000. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 110, between each of the server computers 1000 (or other computing resources 112) in each data center 110, and, potentially, between computing resources in each of the server computers 1000.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, from a client device and at a service provider network, a request for interaction with an application that is at least partly managed by the service provider network;
   sending, to the client device, a challenge to authenticate the client device for interaction with the application;
   receiving, from the client device and at the service provider network, first authentication data usable to authenticate the client device for interaction with the application, the first authentication data indicating a user account associated with the client device;
   determining that a network endpoint device, in a remote network, manages an authentication process for the user account interacting with the application;
   initiating the authentication process with the network endpoint device, wherein the network endpoint device has access to a directory associated with the user account;

receiving, from the network endpoint device and at the service provider network, second authentication data indicating that the client device was authenticated via the authentication process; and performing the interaction associated with the application for the user account.

2. The method of claim 1, wherein:

the user account is at least one of a username or an email address; and initiating the authentication process includes sending the username or the email address to the network endpoint device.

3. The method of claim 1, further comprising:

determining access permissions associated with the user account; and determining that the interaction is permitted by the access permissions.

4. The method of claim 1, wherein:

the service provider network is a first service provider network managed by a first service provider;

the application is hosted on first computing resources of the first service provider network;

the remote network is a second service provider network that is managed by a second service provider; and the directory associated with the user account is managed by a directory service hosted on second computing resources of the second service provider network.

5. The method of claim 1, wherein:

the authentication process includes communicating cryptographic data from the client device and to the network endpoint device, the cryptographic data being usable by the network endpoint device to validate the client device; and the second authentication data is received at the service provider network responsive to the cryptographic data being validated by the network endpoint device.

6. The method of claim 1, further comprising:

based at least in part on receiving the second authentication, sending session credentials to the client device that provide access permissions to the user account for interacting with the application.

7. A system comprising:

one or more processors; and one or more non-transitory computer-readable media storing computer-executable instructions that, when executed by the one or more processors, cause the one or more processors to perform operations comprising:

receiving, from a client device and at a service provider network, a request for interaction with an application that is at least partly managed by the service provider network;

sending, to the client device, a challenge to authenticate the client device for interaction with the application;

receiving, from the client device and at the service provider network, first authentication data usable to authenticate the client device for interaction with the application, the first authentication data indicating a user account associated with the client device;

determining that a network endpoint device, in a remote network, manages an authentication process for the user account interacting with the application;

initiating the authentication process with the network endpoint device, wherein the network endpoint device has access to a directory associated with the user account;

receiving, from the network endpoint device and at the service provider network, second authentication data indicating that the client device was authenticated via the authentication process; and performing the interaction associated with the application for the user account.

8. The system of claim 7, wherein:

the user account is at least one of a username or an email address; and initiating the authentication process includes sending the username or the email address to the network endpoint device.

9. The system of claim 7, the operations further comprising:

determining access permissions associated with the user account; and determining that the interaction is permitted by the access permissions.

10. The system of claim 7, wherein:

the service provider network is a first service provider network managed by a first service provider;

the application is hosted on first computing resources of the first service provider network;

the remote network is a second service provider network that is managed by a second service provider; and the directory associated with the user account is managed by a directory service hosted on second computing resources of the second service provider network.

11. The system of claim 7, wherein:

the authentication process includes communicating cryptographic data from the client device and to the network endpoint device, the cryptographic data being usable by the network endpoint device to validate the client device; and the second authentication data is received at the service provider network responsive to the cryptographic data being validated by the network endpoint device.

12. The system of claim 7, wherein:

the interaction with the application includes reading data from memory managed by the application; and performing the interaction includes providing the client device with access to the data.

13. The system of claim 7, the operations further comprising:

based at least in part on receiving the second authentication, sending session credentials to the client device that provide access permissions to the user account for interacting with the application.

14. A method comprising:

receiving, from a client device and at a service provider network, a request for interaction with an application that is at least partly managed by the service provider network;

sending, to the client device, a challenge to authenticate the client device for interaction with the application;

receiving, from the client device and at the service provider network, first authentication data usable to authenticate the client device for interaction with the application, the first authentication data indicating a user account associated with the client device;

determining that a network endpoint device, in a remote network, manages an authentication process for the user account interacting with the application;

initiating the authentication process with the network endpoint device, wherein the network endpoint device has access to a directory associated with the user account;

receiving, from the network endpoint device and at the service provider network, second authentication data indicating that the client device was authenticated via the authentication process; and performing the interaction associated with the application for the user account.

15. The method of claim 14, wherein:

the user account is at least one of a username or an email address; and initiating the authentication process includes sending the username or the email address to the network endpoint device.

16. The method of claim 14, further comprising:

determining access permissions associated with the user account; and determining that the interaction is permitted by the access permissions.

17. The method of claim 14, wherein:

the service provider network is a first service provider network managed by a first service provider;

the application is hosted on first computing resources of the first service provider network;

the remote network is a second service provider network that is managed by a second service provider; and the directory associated with the user account is managed by a directory service hosted on second computing resources of the second service provider network.

18. The method of claim 14, wherein:

the authentication process includes communicating cryptographic data from the client device and to the network endpoint device, the cryptographic data being usable by the network endpoint device to validate the client device; and the second authentication data is received at the service provider network responsive to the cryptographic data being validated by the network endpoint device.

19. The method of claim 14, wherein:

the interaction with the application includes reading data from memory managed by the application; and performing the interaction includes providing the client device with access to the data.

20. The method of claim 14, further comprising:

based at least in part on receiving the second authentication, sending session credentials to the client device that provide access permissions to the user account for interacting with the application.

\* \* \* \* \*